R. SHERMAN.
VEHICLE LOCK.
APPLICATION FILED JAN. 19, 1921.
1,413,194. Patented Apr. 18, 1922.
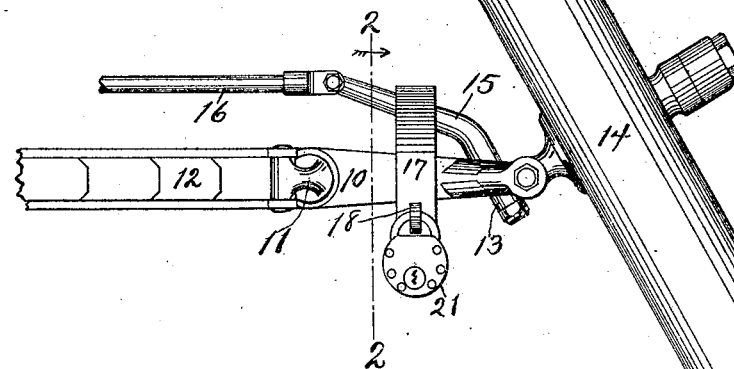
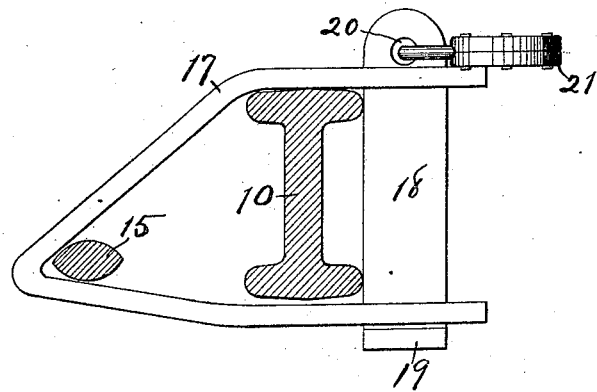

UNITED STATES PATENT OFFICE.

RUSSELL SHERMAN, OF DES MOINES, IOWA.

VEHICLE LOCK.

1,413,194.     Specification of Letters Patent.     Patented Apr. 18, 1922.

Application filed January 19, 1921. Serial No. 438,336.

*To all whom it may concern:*

Be it known that I, RUSSELL SHERMAN, a citizen of the United States of America, and resident of Des Moines, Polk County, Iowa, have invented a new and useful Vehicle Lock, of which the following is a specification.

The object of this invention is to provide an improved construction for a lock for vehicles adapted to prevent unauthorized removal of a vehicle from any given location any considerable distance, thus minimizing the risk of loss by theft.

My invention consists of a yoke or clevis adapted to be mounted in embracing relation with an axle, or other fixed member, and a part of the steering mechanism of the vehicle, and means for locking said yoke in such position as to prevent operation of said steering mechanism, whereby the vehicle, when operated with the lock in operative position, will travel, if at all, on an arc.

My invention consists further in the construction, arrangement and combination of elements hereinafter set forth, pointed out in the claims and illustrated by the accompanying drawing, in which—

Figure 1 is a plan illustrating parts of a vehicle and my improved device mounted thereon in operative relation. Figure 2 is a cross-section, on an enlarged scale, on the indicated line 2—2 of Figure 1.

In the construction of the devices as shown the numeral 10 designates a part of the front axle, 11ᵃ spring perch, 12 a part of the front spring, 13 the steering knuckle, 14 a front or steering wheel, 15 a steering-knuckle arm and 16 a connecting rod, forming parts of a well-known vehicle. The steering-knuckle 13, wheel 14 and arm 15 are shown in the positions assumed by them when the front or steering wheels are turned or cramped laterally in one direction, in which position they provide for travel of the vehicle, when moved, in a curved or arcuate path. A yoke 17 is mounted in embracing relation on the axle 10 and arm 15, and said yoke is tapered or V-shaped in its central portion to confine the arm. The yoke 17 is formed with registering holes in end portions of its arms and said holes preferably are rectangular in form. A locking pin 18 is mounted removably and replaceably in the holes in the yoke 17 adjacent the axle 10 and on the opposite side of said axle from the rod 15, in such manner as to hold said yoke on and in embracing relation with the axle and rod. The locking pin 18 preferably is rectangular in cross-section and is fitted to the holes in the yoke in such position that the width of the pin is perpendicular to the front of the axle, thus presenting the greatest lateral strength of the pin to the axle. The locking pin 18 is formed with a head 19 on one end adapted to engage an arm of the yoke 17 and limit movement of the pin in one direction in the yoke, and the opposite end portion of the pin is formed with a hole 20 adapted to receive a retaining device, such as a lock 21, which will engage the opposite arm of the yoke and limit movement of the pin in the opposite direction. The pin 18 may be applied as shown or in reversed position as desired. Any suitable lock or retaining device may be employed in the hole 20, and the head 19 of the pin may be a single or duplicate flange, or be altered in form.

The yoke may be made in different sizes and shapes to accommodate different elements with which it is used.

It is the function of my improved device to so connect a member of the steering mechanism with a fixed member of the vehicle that the steering wheels are turned laterally or cramped and cause the vehicle to travel, when moved, on an arcute or curved path. Thus, when unauthorized removal or theft of the vehicle is attempted when the lock is in operative position, the vehicle will not travel straight-away, thereby limiting the distance to which it can be removed on its own wheels.

I claim as my invention—

1. The combination with a fixed and a movable member which are hinged together and arranged at the limit of movement of articulation in one direction, of a yoke embracing said members, said yoke being tapered or V-shaped in its central portion to confine said movable member, a headed pin extending through end portions of said yoke and across the open end thereof, and a retaining device carried by said pin and adapted to engage one arm of the yoke.

2. An automobile lock, comprising a onepiece yoke formed tapering or V-shaped in its central portion and adapted to embrace and confine a steering arm, end portions of said yoke being apertured in alinement and adapted to embrace an axle member, and a separate pin removably and replaceably mounted in the holes of said yoke adjacent said axle member, together with a lock adapted to engage said pin and prevent withdrawal thereof.

Signed at Des Moines, in the county of Polk and State of Iowa, this 13th day of December, 1920.

RUSSELL SHERMAN.